United States Patent [19]

Gellerson

[11] Patent Number: 4,962,786
[45] Date of Patent: Oct. 16, 1990

[54] HYDRAULIC FUSE WITH PRESSURE REGULATOR

[75] Inventor: Walter G. Gellerson, Yakima

[73] Assignee: Dowty Decoto, Inc., Yakima, Wash.

[21] Appl. No.: 424,943

[22] Filed: Oct. 23, 1989

[51] Int. Cl.⁵ ............................................ F16K 21/16
[52] U.S. Cl. ................................ 137/493.6; 137/508; 137/512.5; 251/16
[58] Field of Search ................... 137/493, 493.8, 493.9, 137/493.6, 110, 508, 538, 462, 512.5; 251/16

[56] References Cited

U.S. PATENT DOCUMENTS

| | | | |
|---|---|---|---|
| 2,592,486 | 4/1952 | Stark | 251/16 |
| 2,592,487 | 4/1952 | Stark | 251/16 |
| 4,655,245 | 4/1987 | Gellerson | 251/16 |
| 4,819,688 | 4/1989 | Field | 137/493.6 |

Primary Examiner—Stephen M. Hepperle
Attorney, Agent, or Firm—William W. Haefliger

[57] ABSTRACT

A hydraulic fuse monitors the quantity of hydraulic fluid passing through the fuse, and then blocks such flow when a selected quantity of fluid has passed through the fuse which includes: a body structure containing cavity structure; a primary piston in the cavity structure and movable endwise to control fluid flow through a first port; a sleeve, and a slider in the cavity structure, and in the path of fluid flow toward the primary piston; the sleeve and slider being coaxially relatively axially movable, and there being a regulator spring acting to urge the sleeve in one axial direction; and fluid flow control slots formed by the sleeve and slider to control flow both to the piston for controllably displacing same, and to the first port, and characterized in that as the forward flow rate through the fuse reaches a threshold, the piston begins its movement toward the port, and as the flow rate increases above the threshold, relative axial movement between the sleeve and slider acts to maintain nearly constant the fluid pressure drop across primary slot means included with the control slots, and to controllably meter fluid flow to the piston via metering slot means included within the control slots, for displacing the first piston as aforesaid; whereby the piston is displaced to close the first port after a required quantity of fluid has passed through the fuse.

9 Claims, 3 Drawing Sheets

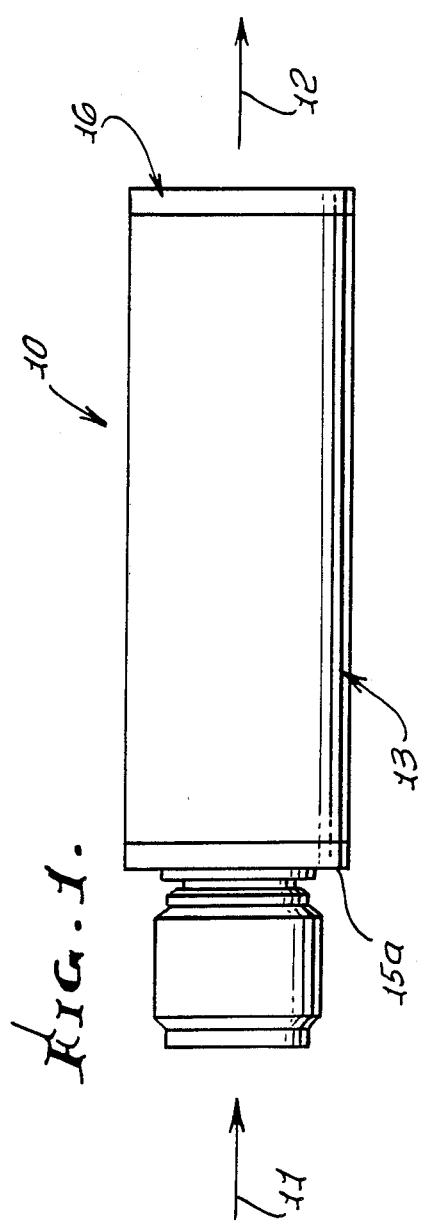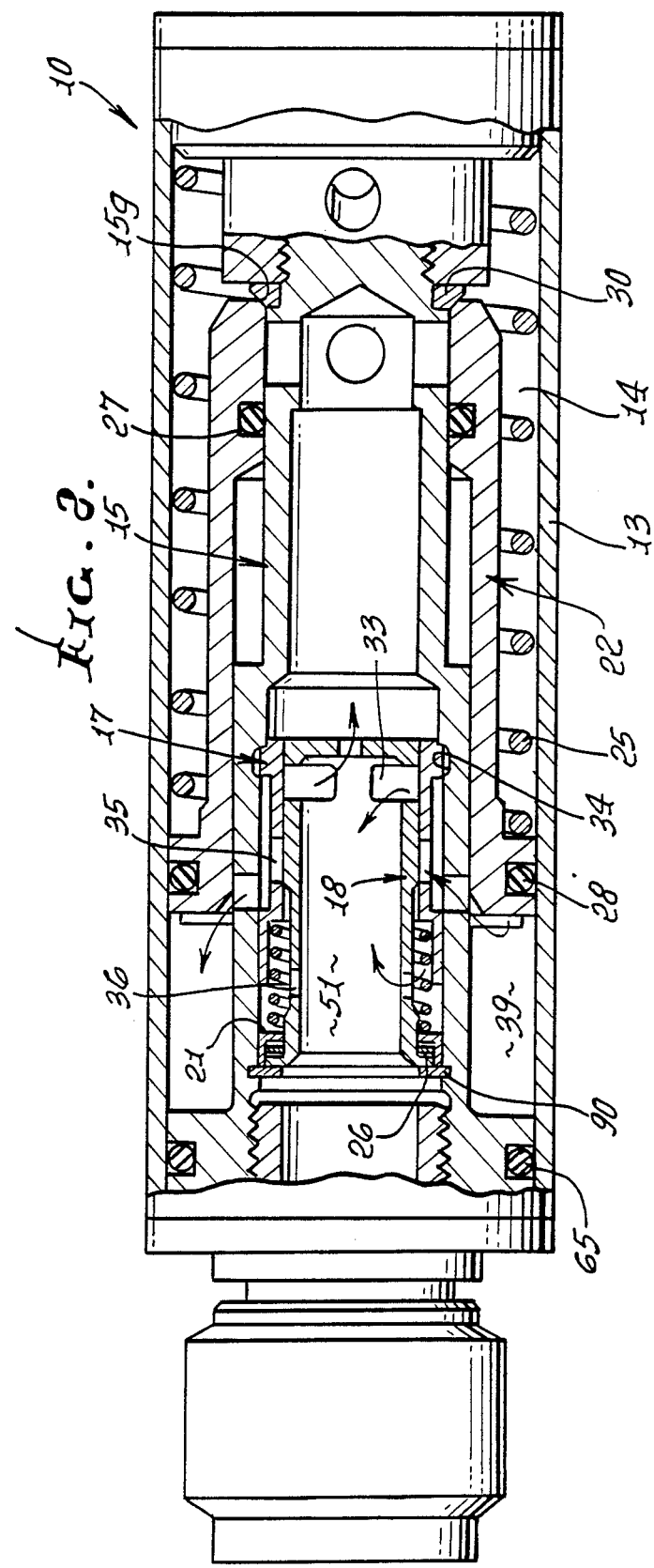

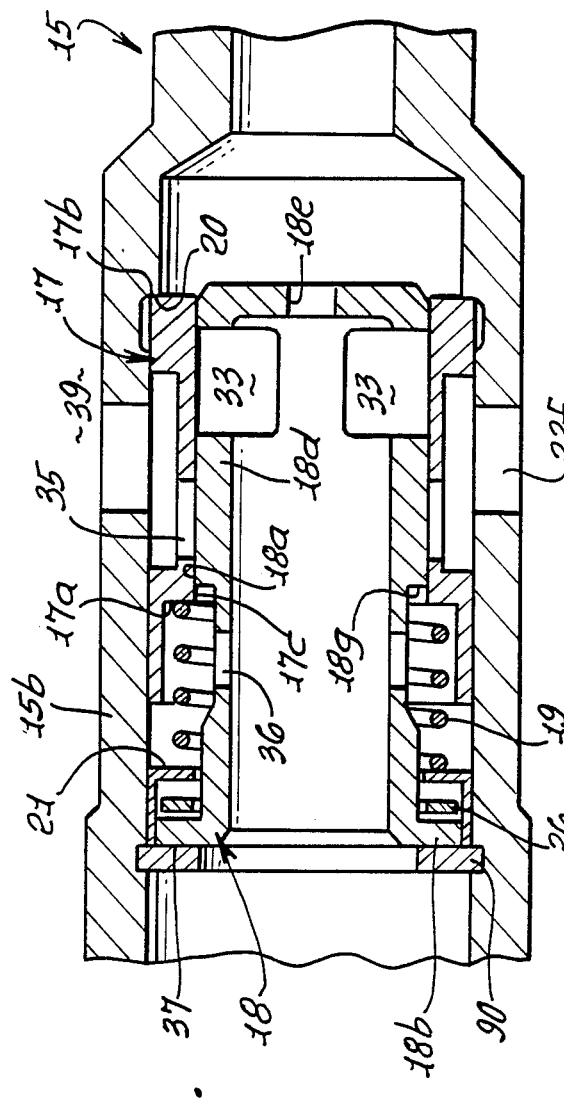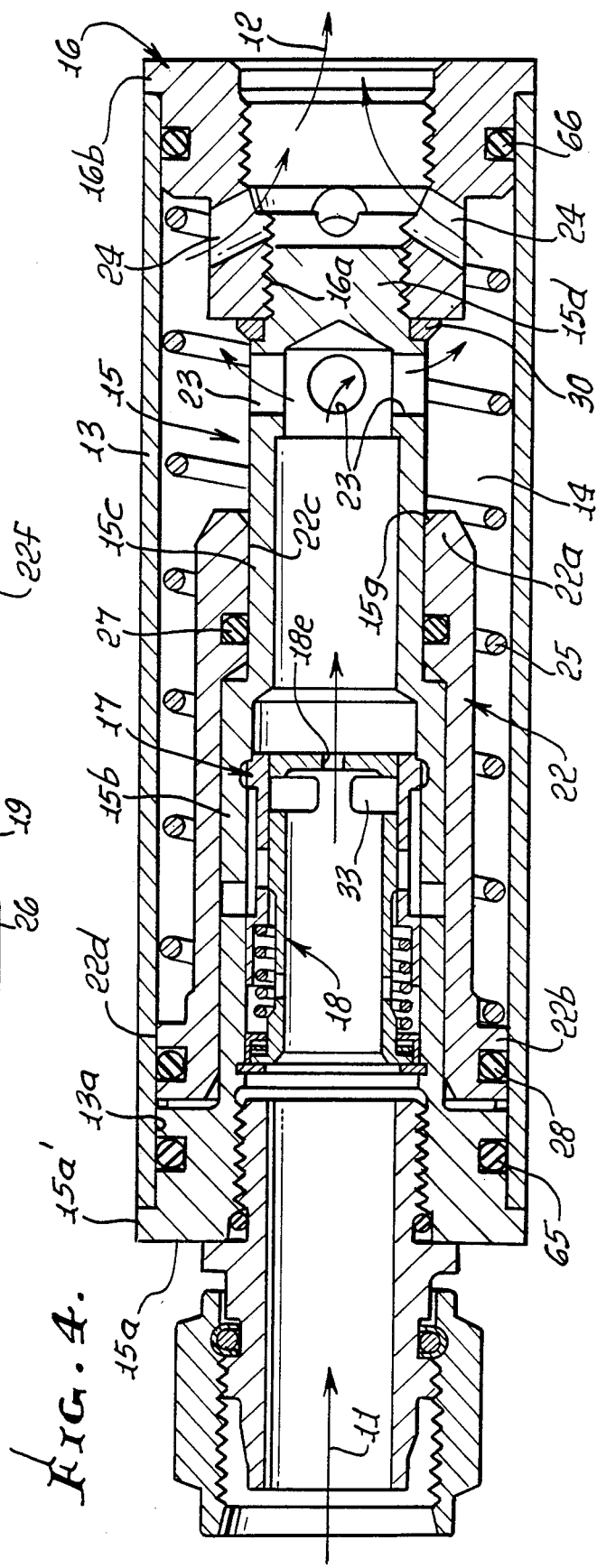

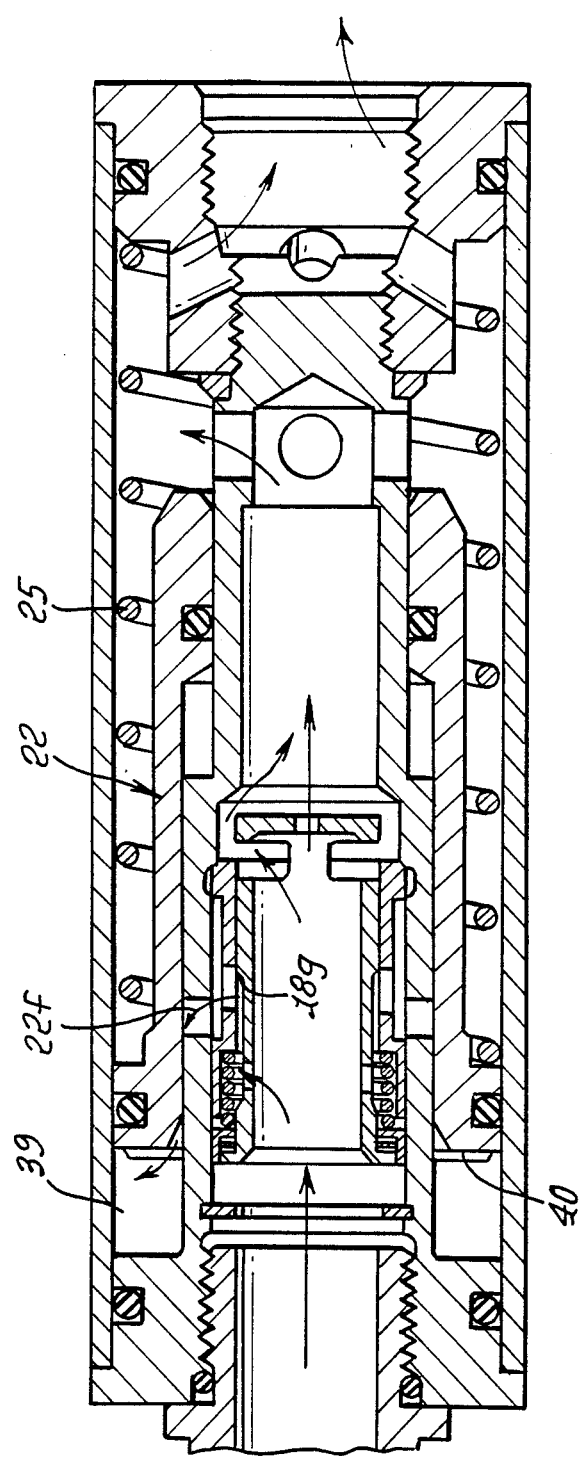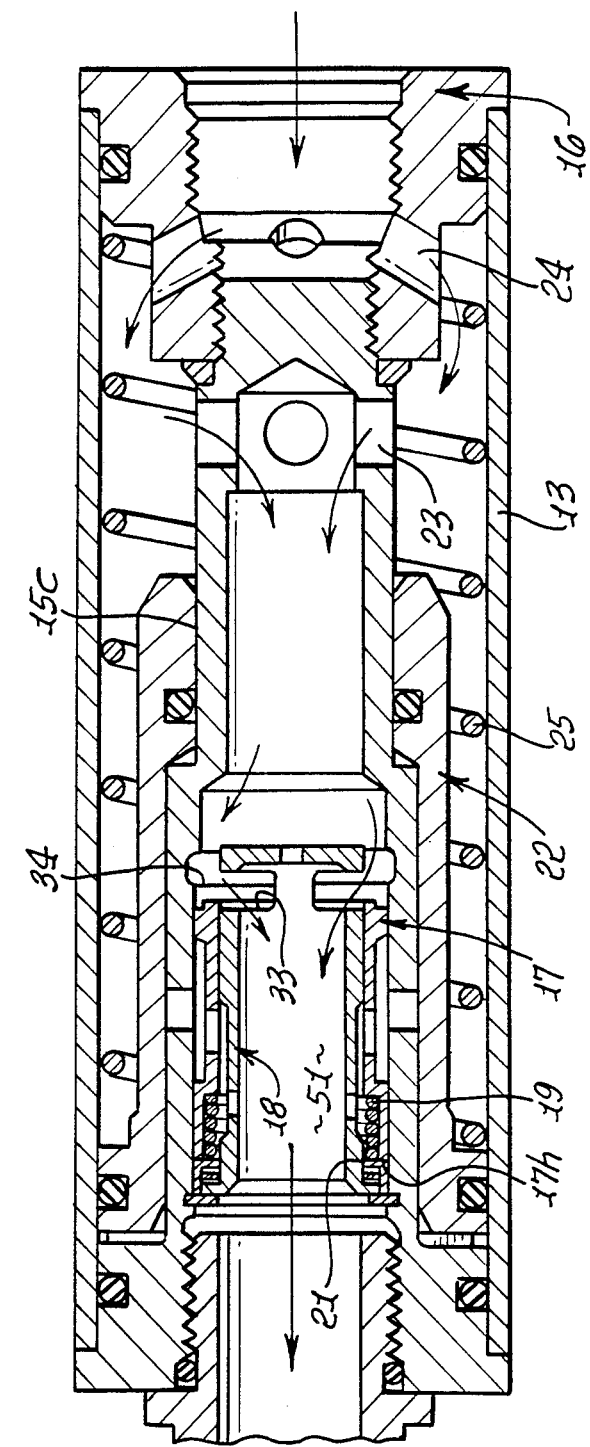
FIG. 5.
FIG. 6.

HYDRAULIC FUSE WITH PRESSURE REGULATOR

BACKGROUND OF THE INVENTION

This invention relates generally to hydraulic "fuse" devices; and more particularly, it concerns an in-line hydraulic fuse, or sensor, that monitors the quantity of hydraulic fluid that passes through the device, and then blocks the flow when a pre-selected quantity of fluid has passed through.

Devices to accomplish the above functions have employed buoyant pistons and vane motors. Testing of a buoyant piston device showed it to be undesirably and inherently sensitive to changes in attitude of the device; and it was also undesirably critical with respect to fit and clearances. Vane motors, on the other hand, are undesirably expensive. There is need for a simple, effective device having few manufactured parts, relatively high force levels of sensing mechanism, and with flow/volume characteristics which can be readily tailored, i.e. fitted, to many different design requirements.

My U.S. Pat. No. 4,655,248 describes an improved fuse that overcomes many of the deficiencies and problems of such prior devices.

SUMMARY OF THE INVENTION

It is a major object of the invention to provide an improved fuse meeting the above needs, as well as providing additional unusual advantages in construction, modes of operation and results. The fuse of this invention employs an accurate pressure regulator which senses flow through the fuse and regulates a proportional but smaller flow into a zone bounded by a movable piston. Movement of the piston is used to shut-off fluid flow when the desired fluid quantity has passed through the fuse. The hydraulic fuse has few moving parts, a constant high force level in the sensing mechanism, and its flow volume characteristics can be tailored to almost any requirement. The fuse can then be reset either by flowing fluid in the reverse direction or by lowering the differential pressure across the fuse assembly to a pre-set level, as for example 5 psid. A threshold feature is also provided to prevent closing of the fuse when the flow rate is less than a pre-set level, as for example 0.40 gpm.

The inventive combination includes:

(a) a body structure containing cavity structure,
(b) a primary piston in the cavity structure and movable endwise to control fluid flow through a first port,
(c) a sleeve, and a slider in the cavity structure, and in the path of fluid flow toward the primary piston,
(d) the sleeve and slider being coaxially relatively axially movable, and there being a regulator spring acting to urge the sleeve in one axial direction,
(e) and fluid flow control slots formed by the sleeve and slider to control flow both to the piston for controllably displacing same, and to the first port, and characterized in that:
  (i) as the forward flow rate through the fuse reaches a threshold, the piston begins its movement toward the first port, and
  (ii) as the flow rate increases above that threshold, relative axial movement between the sleeve and slider acts:
    to maintain nearly constant the fluid pressure drop across primary slot means included within the control slots; and
    to controllably meter fluid flow to the piston via metering slot means included within the control slots, for displacing the primary piston as aforesaid,
(f) whereby the piston is displaced to close the first port after a required quantity of fluid has passed through the fuse.

As will appear, the slider is generally guided on, and is axially movable relative to, and within, the sleeve; and the spring urges the sleeve in a direction acting to reduce fluid flow through the primary slot means located in the sleeve and slider. Further, the slider is typically hollow to pass flow via the primary slot means from the slider interior to the slider exterior, and via the primary slot means toward the first port. Further, the control slot means communicates with an annular cavity within which the sleeve is axially movable; and the control slots may typically include primary slot means extending radially through the sleeve to pass the flow to the first port in full flow axial position of the sleeve. The control slots may also include threshold slot means associated with the primary slot means to initiate flow through the sleeve to the first port when the sleeve is in, or approximately in, no-flow position.

These and other objects and advantages of the invention, as well as the details of an illustrative embodiment, will be more fully understood from the following specification and drawings, in which:

DRAWING DESCRIPTION

FIG. 1 is an external elevation;
FIG. 2 is a section taken in elevation through the fuse;
FIG. 3 is an enlarged fragmentary section showing elements of the fuse; and
FIGS. 4-6 are schematic views showing three different modes of fuse operation.

DETAILED DESCRIPTION

The illustrated hydraulic fuse 10 is adapted to monitor the quantity of hydraulic fluid passing through it, for example in direction of arrows 11 and 12, and then block such flow when a selected quantity of fluid has passed through the device.

The fuse includes cylindrical body structure 13 containing cavity structure 14. Located within the latter is a tubular housing 15 that extends coaxially within the cylinder 13. The housing includes a rearwardmost enlarged section 15a serving as a tubular plug telescopically fitting the cylinder bore 13a, intermediate sections 15b and 15c, and a forward reduced section 15d. The latter threadably interfits a threaded bore 16a of a plug 16, closing same. Plug 16 is tubular and is received in the forward end of the cylinder. Section 15c is reduced relative to section 15b. Housing 15 is fixed to body 13, via end flanges 15a' and 16b.

A sleeve 17 and a slider or slide 18 are coaxially located in the cavity structure, as for example within section 15b of the housing. These elements are coaxially relatively movable, and a regulator spring, such as coil spring 19, acts to urge the sleeve in one axial direction, i.e. rightwardly, in the drawings. Note in FIG. 3 and FIG. 4 that spring 19 engages leftward facing shoulder 17a of the sleeve, urging the rightward facing end shoulder 17b of the sleeve against leftward facing shoulder 20 of the housing 15. The cylindrical outer surfaces 18a of the slider 18 may be guided for axial movement by the sleeve bore 17c, as seen in FIG. 3. The leftward end of the spring engages an annular axially slidable cup or seat 21. The slider is also axially movable, as between leftward (reverse flow position) as seen in FIGS. 3 and 6, and rightward (forward position) as seen in FIG. 5, and an annular "reset" spring washer 26 resists rightward movement of the slider. That washer is captivated between seat 21 and flange 18b of the slider retained by retaining ring 90.

A primary piston 22 is located in the cavity structure within the cylinder, to move axially endwise for controlling fluid flow through first radial ports 23 formed through the wall of 15c. As shown, the piston 22 is annular and its bore 22c is slidable along the tubular section 15c of the housing. As the piston moves rightwardly, its head 22a ultimately closes the four exit ports 23 in section 15c to block forward flow of fluid via such ports (such forward flow seen in FIG. 4) and to exit ports 24 in the plug 16. A compression spring 25 in cavity 14 yieldably resists forward movement of the piston, the spring leftward end engaging piston flange 22b. Seals 27 and 28 respectively seal off between the piston bore 22c and the guide section 15c, and between the piston flange outer surface 22d and the bore 13a of cylinder 13. The tapered forward end 15g of the piston head seats against a tapered seal 30 on plug 16, in extreme rightward position of the piston, the piston then closing exit ports 23 When the piston is retracted to the left, as seen in FIG. 4, fluid may flow forwardly via threshold orifice 18e to the interior 31 of the housing section 15c, then out ports 23, and through angled ports 24, to the hollow interior 32 of the plug 16, and then rightwardly. This is the forward flow mode, as seen in FIG. 4. Central orifice 18e through the right end wall of the slide is used for threshold flow. Threshold flow is that flow rate below which the fuse will not function. This is to allow normal leakage downstream of the fuse to occur without limit.

At this time, flow control slots 33 formed by the slider are closed by the sleeve, as best seen in FIG. 3. Slot 33 is formed through the wall 18d of the slide.

Fluid flow control slots are also indicated at 35 (a metering slot through the sleeve wall) and at 36 (a slot through the wall 18d of the slide). Slots 35 and 36 may be regarded as primary slot means. As the slide is urged forwardly (rightwardly) by pressure application on leftward facing surfaces 37 and 38, and relative to the sleeve, as best seen in FIG. 5, slot 36 ultimately communicates with slot 35, (shoulder 18g registers with slot 35) passing fluid to the piston chamber 39 via slots 22f for driving the piston rightwardly when leftward force exerted by piston spring 25 is overcome. Note that regulator spring 19 resists slider movement to the right, so that such rightward movement of the piston cannot take place until the leftward force of spring 19 is overcome by rightward fluid pressure on the slider, and until the fluid pressure in the chamber 39 and exerted rightwardly on piston face 40 overcomes the leftward force of spring 25.

FUSED FORWARD FLOW

This mode of operation begins when the forward flow rate through the fuse approaches the upper threshold point as determined by orifice 18e. See FIG. 4. (The threshold point for the fuse may for example be between 0.40/0.60 GPM.) The upper threshold is set by the orifices, piston area and spring force, and is exemplified by pressure level in zone 51.

At flow rates near the upper threshold, the slide will begin to move due to pressure exerted on 18a, opening and closing the area between it and the sleeve, in order to maintain a nearly constant pressure drop, the value of which is set by the regulator spring force and the area of the slide.

Since the pressure drop across the slide is nearly constant, due to overlap of ports 33 and 34, flow through the fuse can be related to the position of the slide. The position of the slide also dictates the opening of the metering slot 35 leading to the piston, and therefore the flow rate delivered to the piston cavity or chamber 39. This, in turn, determines the closing time of the fuse. Therefore, at any flow rate, the amount of fluid which has flowed through the fuse is related by the orifice coefficients of the slide opening 36 and the metering slot 35 and their respective flow areas that come into registration.

Testing has shown that the relationship between these two orifices is nearly parallel, so that a rectangular metering slot 34 can be used. Therefore, the quantity of fluid which has flowed through the fuse is directly related to the position of the slide.

As inlet flow increases, a point is reached that provides a sufficient differential pressure across the piston to fully compress the piston spring, so that the piston moves rightwardly. After the required amount of fluid volume has been reached, flow is shut off by sealing at the interface of the piston end 15g and the fusing seal 30. This type of seat is virtually leak-free. In order to reduce the impact on the seal at shut-off, the exit holes 23 are located leftwardly of the seal. When these holes are closed off by the piston, the fluid flow is greatly reduced, thereby reducing the tendency to unseat the fusing seal. With the reduced flow rate, the pressure differential across the piston rises rapidly and moves the piston taper 15g to the seal 30 quickly.

The built-in threshold feature is accomplished by having the pressure required to move the piston to the fusing position greater than the differential pressure across the pressure regulator at the threshold flow.

REVERSE FLOW

In this mode, as seen in FIG. 6, the piston 22 is to be displaced to the left, to seat at 50. Fluid flows leftwardly via ports 24 and then 23 to interior 31, and then reversely through ports 34 and 33 to interior 51 of the slide. It then exits to the left of the unit. Fluid pressure acting on the sleeve, displaces it leftwardly to overcome the regulator spring 19, and the left end 17h of the sleeve seats on the seat 21, at which time the reverse flow path is open.

RESET MODE

FIG. 2 shows the device in reset mode, which occurs when the differential pressure across the fuse i.e. acting in chamber 39 on the area of the piston falls to a level that can be overcome by the piston spring 25. For example, this point may be approximately 12 psid. In the reset mode the slide is seated on the retaining ring 21 by the reset spring 26 which is a thin wave spring. In this position, a flow path is opened from the piston chamber 39 via slots 35 and 36 to interior 51, and then forwardly via slots 33 and 34, whereby fluid in the piston cavity is forced or exhausted through and out the inlet ports 33 and 34. In order, for example, to achieve a total reset of the fuse in under 2.0 seconds a 5 psi pressure differential is required. See FIG. 2.

Since the pressure drop across the slide will never exceed a set limit, such as 18 psid, even at extreme flow rate, the diametral clearance between the sleeve and slide can be quite large. In one design, this clearance is 0006/.0010 inches which allows the components to be interchangeable with no matched sets.

The spring seat cup 21 rests on the retaining ring 90 when in the non-active condition. The purpose of the spring washer 26 is to position the slide 18 in the bottomed position against the retaining ring. In this position the reset ports in the sleeve are open so that the fluid in the fusing ports in the sleeve are open whereby the fluid in the fusing cavity can flow out, thereby allowing the fuse piston to return to its normal position.

O-ring or packing seals are indicated at 65, 28, 27 and 66.

I claim:

1. In an improved hydraulic fuse to monitor the quantity of hydraulic fluid passing through the fuse, and then block such flow when a selected quantity of fluid has passed through the fuse, the combination comprising:
   (a) a body structure containing cavity structure,
   (b) a primary piston in the cavity structure and movable endwise to control fluid flow through a first port,
   (c) a sleeve, and a slider in the cavity structure, and in the path of fluid flow toward the primary piston,
   (d) the sleeve and slider being coaxially relatively axially movable, and there being a regulator spring acting to urge the sleeve in one axial direction,
   (e) and fluid flow control slots formed by the sleeve and slider to control flow both to said piston for controllably displacing same, and to said first port, and characterized in that:
      (i) as the forward flow rate through the fuse reaches a threshold, the piston begins its said movement toward said first port, and
      (ii) as the flow rate increases above said threshold, relative axial movement between the sleeve and slider acts:
         to maintain nearly constant the fluid pressure drop across primary slot means included within said control slots; and
         to controllably meter fluid flow to the piston via metering slot means included within said control slots, for displacing said primary piston as aforesaid,
   (f) whereby the piston is displaced to close the first port after a required quantity of fluid has passed through the fuse,
   (g) the slider being hollow to pass flow via said primary slot means from the slider interior to the slider exterior, and via said primary slot means toward said first port.

2. The combination of claim 1 wherein the slider is guided on, and is axially movable relative to, and within, the sleeve.

3. The combination of claim 2 wherein the spring urges the sleeve in a direction acting to reduce fluid flow through said primary slot means located in the sleeve and slider.

4. In an improved hydraulic fuse to monitor the quantity of hydraulic fluid passing through the fuse, and then block such flow when a selected quantity of fluid has passed through the fuse, the combination comprising:
   (a) a body structure containing cavity structure,
   (b) a primary piston in the cavity structure and movable endwise to control fluid flow through a first port,
   (c) a sleeve, and a slider in the cavity structure, and in the path of fluid flow toward the primary piston,
   (d) the sleeve and slider being coaxially relatively axially movable, and there being a regulator spring acting to urge the sleeve in one axial direction,
   (e) and fluid flow control slots formed by the sleeve and slider to control flow both to said piston for controllably displacing same, and to said first port, and characterized in that:
      (i) as the forward flow rate through the fuse reaches a threshold, the piston begins its said movement toward said first port, and
      (ii) as the flow ate increases above said threshold, relative axial movement between the sleeve and slider acts:
         to maintain nearly constant the fluid pressure drop across primary slot means included within said control slots; and
         to controllably meter fluid flow to the piston via metering slot means included within said control slots, for displacing said primary piston as aforesaid,
   (f) whereby the piston is displaced to close the first port after a required quantity of fluid has passed through the fuse,
   (g) the slider being guided on, and axially movable relative to, and within, the sleeve,
   (h) the spring urging the sleeve in a direction acting to reduce fluid flow through said primary slot means located in the sleeve and slider,
   (i) the slider being hollow to pass flow via said primary slot means from the slider interior to the slider exterior, and via primary slot means toward said first port.

5. The combination of claim 1 wherein said control slots include metering slot means communicating with an annular cavity within which the sleeve is axially movable.

6. The combination of claim 1 wherein said primary slot means extends radially through the sleeve to pass the flow to said first port in full flow axial position of the sleeve.

7. The combination of claim 6 wherein said primary slot means includes threshold slot means to initiate flow through the sleeve to said first port when the sleeve is in, or approximately in, no flow position.

8. The combination of claim 7 wherein said control slots include metering slots means in the sleeve and axially spaced from primary slot means in the slider to meter said flow to the piston.

9. In combination in a hydraulic fuse,
   (a) a housing,
   (b) tubular slide, tubular sleeve, and tubular piston elements, all of which are relatively axially movable,
   (c) a main spring urging the piston in one axial direction, and a regulator spring urging the sleeve in the opposite axial direction,
   (d) said elements having a forward flow mode in which flow passed via the slide and sleeve is metered and reduced as the slide moves forwardly to provide constant pressure drop; and also in which fluid pressure passes via the slide and via the sleeve to the piston acts to displace the piston forwardly, and overcoming the main spring to shut off forward flow when a required volume of fluid is reached, (e) said elements having a reset mode in which the main spring urges the piston leftwardly when fluid pressure across the fuse drops to a pre-set level, and in which the slide is seated in leftward position, and in which a flow path is opened via the sleeve to release fluid as piston moves leftwardly, (f) said elements also having a reverse flow position in which fluid passes reversely via exit slots in the housing into the interior of the sleeve, and pressure displaces the sleeve against the regulator spring, whereby flow then exits to inside of the housing and out the inlet port, (g) said sleeve and slide being coaxially relatively movable, and forming control slots to control flow to the piston, and characterized in that as the flow rate increases above a threshold relative axial movement between the sleeve and slide acts:

to maintain nearly constant the fluid pressure drop across primary slot means included within said control slots; and to controllably meter fluid flow to the piston via metering slot means included within said control slots, for displacing said primary piston as aforesaid, (h) the slide being hollow to pass flow via said primary slot means from the slider interior to the slide exterior, and via said primary slot means toward said first port.

* * * * *